Nov. 3, 1970

J. V. STOVER ET AL 3,538,350

CAPACITIVE VOLTAGE DISTRIBUTION NETWORK FOR
SERIES CONNECTED TRANSISTOR SWITCHES

Filed Oct. 26, 1967

INVENTORS.
JOE V. STOVER,
BY GEORGE SLOAN,

Allen A. Dicke Jr.,

AGENT.

ns is directed to the control of series connected transistor switches so that each switch in the series is protected form being subjected to more than a tolerable voltage during transient turn off and turn on operations, as well as during the off state.
United States Patent Office 3,538,350
Patented Nov. 3, 1970

3,538,350
CAPACITIVE VOLTAGE DISTRIBUTION NETWORK FOR SERIES CONNECTED TRANSISTOR SWITCHES
Joe V. Stover, Fullerton, and George Sloan, Anaheim, Calif., assignors to Hughes Aircraft Company, Culver City, Calif., a corporation of Delaware
Continuation-in-part of applications Ser. No. 554,028, May 31, 1966, and Ser. No. 595,083, Nov. 17, 1966. This application Oct. 26, 1967, Ser. No. 678,293
Int. Cl. H03k 17/00
U.S. Cl. 307—255
9 Claims

ABSTRACT OF THE DISCLOSURE

When series connected transistor switches are connected across a source of voltage which is higher than the standoff voltage of any one of the series connected transistor switches, it is necessary to distribute the voltage across the switches during transitional and off states. The voltage change across a switch is measured by a capacitor parallel thereacross and connected to the base of the succeeding transistor switch so that as the voltage rises across the first switch, the second one is driven off. Such a capacitor is parallel across each transistor switch in the series. Additional protection is furnished by a Zener diode paralleled across each transistor switch so that the Zener breaks down and conducts before the voltage across the transistor switch exceeds its tolerable standoff voltage. The Zener is also connected to the base of the succeeding switch to drive the succeeding switch towards its nonconductive state. The series connected transistors can be turned on or off by appropriately pulsing the base of one or more transistor switches.

---

The invention herein described was made in the course of or under a contract or subcontract thereunder, with the U.S. Air Force, Department of Defense.

CROSS REFERENCE

This application is a continuation-in-part of the following applications for United States utility patent: Ser. No. 554,028, filed May 31, 1966, now Pat. No. 3,526,788, granted Sept. 1, 1970; and Ser. No. 595,083, filed Nov. 17, 1966, now Pat. No. 3,526,787, granted Sept. 1, 1970.

BACKGROUND

This invention is directed to the control of series connected transistor switches so that each switch in the series is protected form being subjected to more than a tolerable voltage during transient turn off and turn on operations, as well as during the off state.

The switching of large currents in high voltage lines presents a difficult switching situation. Opening a mechanical switch against large currents results in the drawing of a long arc, with consequent tremendous energy absorption in the switching device. Rapid switching is essential to keep the energy absorption in the switching device at a reasonable level. Furthermore, many switching applications require that switching be quickly accomplished. Devices capable of rapidly switching even moderate currents at fairly high voltages have not been available, with a result that there is a considerable need for such devices. Even devices capable of quickly switching high voltages at moderate curernts would be helpful for such applications, because they can be connected in parallel to provide the requisite current capacity.

Transistors are devices which are capable of switching at the requisite speed, but to date they are only available in ratings of a few amperes at one kilovolt. However, series connection of such transistors permits them to operate in switching circuits of several kilovolts, providing the voltage applied across each transistor does not exceed the standoff voltage of that transistor during the turn on and turn off times as well as during the off period. Complementary pair switching circuits have been described in the earlier applications, cross referenced above, and these employ several different means for equalizing or maintaining within proper limits the voltage across each section of the series set of switches.

SUMMARY

In summary, this invention is directed to a capacitive voltage distribution network for series connected transistor switches. The switches comprise complementary pairs and across each of the switches is connected a parallel circuit comprised of a capacitor and a Zener diode. The capacitor is charged during the turn off signal, and is connected to the base of the subsequent transistor so that during transient turn on and turn off, the capacitor controls the base of the subsequent transistor so that it also follows the action of the first. Should the voltage impressed across any transistor reach the Zener breakdown point, the voltage is clamped at that point to prevent over voltage on the complementary pair switch section.

Accordingly, it is an object of this invention to provide a capactive voltage distribution network for series connected transistor switches, particularly when the transsistor switches are serially connected in complementary parallel pairs. It is another object of this invention to provide a voltage distribution network which prevents over voltages from being applied across any one of series connected transistor switches. It is a further object of this invention to provide a capacitive voltage distribution network for series connected transistor switches wherein the voltage across one switch drives an adjacent switch to equalize the voltage drop across the serially connected switches. It is still another object to provide protection for serially connected transistor switches which includes a Zener diode associated and parallel to each switch to prevent over voltage across any one of the series connected transistor switches. Other objects and advantages of this invention will become apparent from a study of the following portions of the specification, the claims and the attached drawings.

DESCRIPTION

Figure 2:
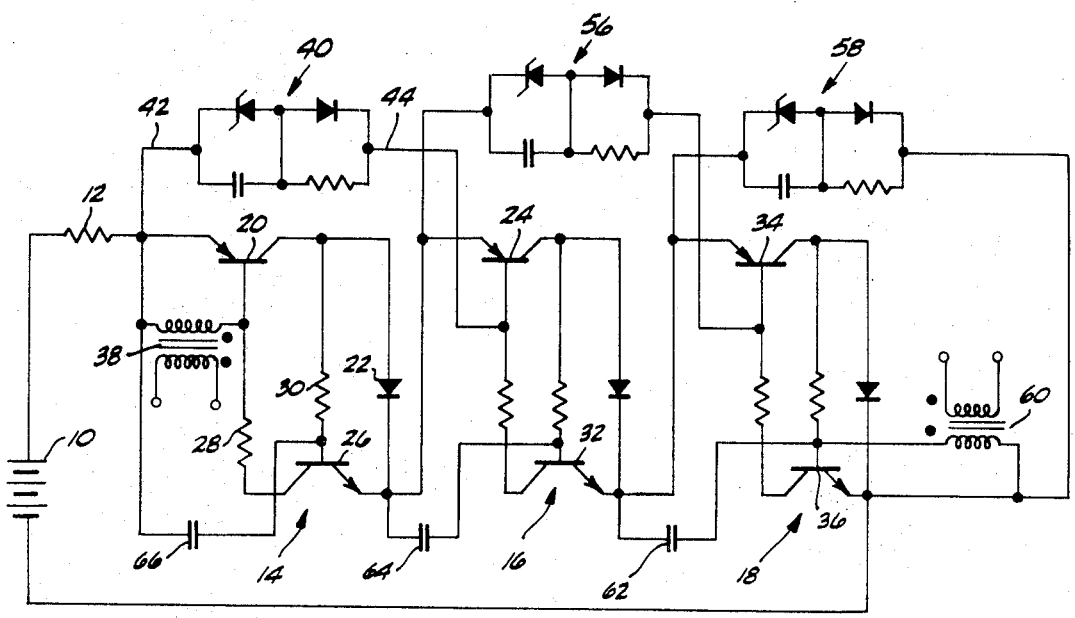
FIG. 2 is a schematic illustartion of complementary pairs of switch elements connected in series and showing the distribution network in association with each of the complementary pairs.

Referring to FIG. 2, the capacitive voltage distribution network connected to distribute the voltage across series connected complementary pairs of transistor switches is illustrated. The voltage source 10 is serially connected to load 12. Complementary pairs of transistor switches are generally illustrated at 14, 16 and 18. These complementary pairs are serially connected to each other and are serially connected between load 12 and source 10 to complete the circuit.

The complementary pairs of transistor switches 14, 16 and 18 are identical, and for convenience, the complementary pair generally illustrated at 14 will be described. The emitter of PNP switching transistor 20 is connected to the load, while the collector of that transistor is connected through diode 22 to the emitter of NPN transistor 26 in the complementary pair 14. The base lead of transistor 20 is connected to the collector of NPN transistor 26, through base resistor 28, if such a base resistor is necessary. Similarly, the collector of transistor 20 is connected to the base of transistor 26, through base resistor 30, if such a base resistor is necessary. The emitter of transistor 26 is connected to the emitter of transistor 24.

Complementary pair 16 is identically connected and has PNP transistor 24 connected with NPN transistor 32. Complementary pair 18 similarly has PNP transistor 34 and NPN transistor 36. These transistors are connected together in the same way as for the described complementary pair 14, to make a series circuit of complementary pairs of transistor switches. As many complementary pairs can be connected together in series as is necessary to permit the series connected switches to hold off the impressed voltage from source 10.

As is described in the cross referenced applications, each of the complementary pairs 14, 16 and 18 acts as a bistable switch. So long as the product of the current gains of the two transistors in a complementary pair is less than unity, the transistors are nonconducting, and when this gain product reaches or exceeds unity, the transistors are on. When proper complementary pairs of transistors are selected, the base resistors 28 and 30 are not necessary. The diode 22 provides the necessary voltage drop from base to emitter in transistor 26 to control the operating point. Such a diode has the function of maintaining a substantially constant voltage drop from base to emitter, to maintain the operating point substantially constant, and thus is superior to an ordinary ohmic resistor.

The bistable nature of the complementary pairs provides an ideal switching circumstance because power does not need to be separately supplied to maintain the transistor switches in either the on or off state.

Pulse transformer 38 has its secondary connected between the emitter and the base of transistor 20. Its primary is connected to receive pulses which represent the off signal to turn the complementary pair units to their nonconductive stage. For this reason, the connections are such that when the series connected complementary pair units are in the conductive state, the base of transistor 20 is pulsed strongly positive with respect to its emitter so that transistor 20 is moved toward its nonconducting condition. Since transistor 20 had been saturated, the positive pulse sweeps the charges from the base and quickly moves the transistor through its storage time. However, this is a capacitive effect, and requires finite time. From the storage time the transistor moves through the transition period where the base bias controls the impedance of the transistor. The effect of a positive pulse is to reduce the gain product of transistors 20 and 26 below unity so that transistor 26 goes through the same stages.

During the transition time of the first unit of the complementary pairs, voltage builds up across the unit. If the succeeding serially connected complementary pairs 16 and 18 are not turned off at the same time, and the source voltage from source 10 exceeds the tolerable voltage across the complementary pair 14, the complementary pair 14 will be subject to voltage above its tolerable limit. The voltage at and the current through the emitter of transistor 24 decreases due to the increasing voltage across complementary pair 14, and this tends to turn off the transistor pair 16. However, such an effect is not sufficiently fast and cannot be relied upon to provide the necessary voltage equalization.

Figure 1:
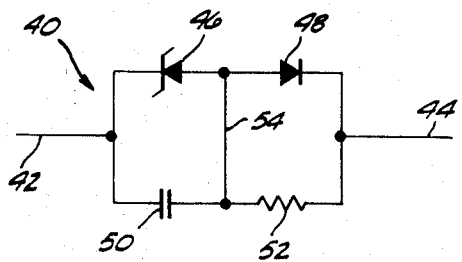
FIG. 1 is a schematic illustration of a capacitive voltage distribution network, including a Zener diode for preventing over voltage.

The capactive voltage distribution network of this invention is generally indicated at 40. It is shown in detail in FIG. 1. Lines 42 and 44 provide connections for the network. The network comprises Zener diode 46 and diode 48 serially connected between lines 42 and 44. Furthermore, capacitor 50 and resistance 52 are serially connected between lines 42 and 44, and parallel to diodes 46 and 48. Line 54 interconnects the intermediate points so that Zener diode 46 and capacitor 50 are connected in parallel and together are serially connected to the paralleled pair represented by diode 48 and resistor 52.

As shown in FIG. 2, network 40 is connected by line 42 to the emitter of transistor 20, and by line 44 to the base of transistor 24. The connection to the base of transistor 24 is effectively connecting the nework across the emitter to collector of transistor 20, for the voltage drop across diode 22 and across the emitter to base junction of transistor 24 is very low. Thus, as voltage drop builds up across transistor 20 as it goes through its transition time, capacitor 50 acts as a current source and through diode 48 impresses a strong positive current pulse into the base of transistor 24. This causes the complementary pair 16 to go through its storage and transition times in the off direction.

Capacitive voltage distribution network 56 is connected across complementary pair 16 while capacitive voltage distribution network 58 is connected across complementary pair unit 18. It is thus seen that the positive current pulsing into the base of transistor 24 in the postive direction sweeps out the transistor charges and moves it through its storage time and transition time to produce a voltage rise thereacross. This voltage rise is signaled to network 56 which in turn turns off transistor 34 of the complementary pair 18. The networks are sufficiently fast that with the usual transistors, they are all going through the transistion stage at the same time so that each is holding off a share of the voltage of source 10.

Since the capacitive voltage distribution network in each case senses the change in voltage with respect to time across the complementary pair to which it is connected in parallel, and this signal is transmitted as the turn off pulse to the next complementary pair, it is essential that storage and fall times be equalized and minimized to turn off the pairs as quickly and simultaneously as possible. They can be minimized and equalized by adjusting the degree of saturation of each transistor so that the transistors are not fully saturated or by the application of reverse bias current drive to the PNP transistors.

In view of the fact that voltage build up across the several series connected complementary pairs may not be equal, it is necessary to prevent over voltage from occurring across any one of these series connected complementary pairs. This is accomplished by Zener diode 46. The characteristic of diode 46 is such that it will break down and pass current before the voltage standoff limit of transistors 20 and 26 is reached. Before the voltage across a complementary pair reaches its maximum tolerable limit, Zener 46 conducts and clamps the voltage across its associated complementary pair at a tolerable value. In optimum switching conditions, the Zeners do not break down, for the transistors in the complementary pairs move out of storage time and through the transition time with sufficient time equality to limit the voltage drop across any complementary pair during transition and final hold off to a tolerable value. On the other hand, under non-optimum conditions, the Zener diodes are available to prevent intolerable voltages.

Pulse transformer 60 has its primary connected in such a manner that pulses to turn on the series connected complementary pairs can be impressed thereon. The secondary of pulse transformer 60 is connected between the base and the emitter of NPN transistor 36. Additionally, a capacitor is connected from the base of each NPN transistor to the previous stage. For example, capacitor 62 is connected between the base of transistor 36 and the output of the prior stage, corresponding to the emitter of transistor 32. Capacitors 64 and 66 are similarly connected, with capacitor 66 being connected between the base of transistor 26 and the input to the complementary pair 14 as represented by the emitter of transistor 20. Thus, when it is desired that the series connected complementary pairs of transistor switches be turned on, transformer 60 is pulsed so that the base of transistor 36 goes positive with respect to its emitter. Transistor 36 rapidly changes to its saturated on state and provides a path for forward base current to flow out of transistor 34. Thus, the complementary pair 18 turns on and this causes a rapidly decreasing voltage drop across the complementary pair. This voltage change occurs in a very short time with a resultant very large voltage rate of change.

Previously to the turn on of complementary pair 18, the voltage of voltage source 10 was divided substantially equally across capacitors 62, 64 and 66. With the turn on of complementary pair 18, capacitor 62 is discharged and capacitors 64 and 66 were required to chargeup to each carry their proportionate share of the voltage from the voltage source. This capacitor charging injects positive pulses into the bases of both transistors 26 and 32 to turn them on. In each case, such turn on increases the gain product above unity so that the other transistor of each pair also turns on. The propagation of the turn on signal is sufficiently fast that no significant over voltage occurs across any switch element. Thus, the Zener diodes are not normally necessary to protect against over voltage during the turn on operation.

When the series connected transistor switches are in their high impedance state, capacitors 50 also carry the voltage of the source divided thereacross. During the transition to the turn on period, the capacitors 50 discharge through the complementary pairs. In order to limit the discharge, current resistors 52 are used. Diodes 48 allow current flow into the capacitors 50 during the transition to the off state by bypassing resistors 52. Thus, capacitors 50 do not have an undesirable effect on the speed of turn on.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A capacitive voltage distribution network for series-connected switches comprising:

first, second and third serially-connected transistor switches connectable in series with a source of voltage and load, each of said transistor switches having an input, an intermediate and an output terminal, control means connected to said first, second and third series-connected transistor switches so that said first, second and third series-connected transistor switches can be all selectively maintained in a high impedance state and a low impedance state, the improvements comprising:

a first capacitor connected between the input terminal of said first transistor switch and the intermediate terminal of said second transistor switch and a second capacitor connected between the input terminal of said second transistor switch and the intermediate terminal of said third transistor switch, said first capacitor being connected to the intermediate terminal of said second transistor switch so that voltage drop across said first transistor switch, caused by turning off of said first transistor switch, drives said second transistor switch toward its high impedance state;

each of said first and second capacitors forming part of first and second capacitive voltage distribution networks, said first and second capacitive voltage distribution networks respectively including first and second Zener diodes, said first and second Zener diodes respectively being connected in parallel to said first and second capacitors so that said first and second Zener diodes respectively prevent impression of voltage across said first and second transistor switches in excess of the Zener diode breakdown voltage.

2. A capacitive voltage distribution network for series-connected switches comprising:

first, second and third serially-connected transistor switches connectable in series with a source of voltage and load, each of said transistor switches having an input, an intermediate and an output terminal, control means connected to said first, second and third series-connected transistor switches so that said first, second and third series-connected transistor switches can be all selectively maintained in a high impedance state and a low impedance state, the improvement comprising:

a first capacitor connected between the input terminal of said first transistor switch and the intermediate terminal of said second transistor switch and a second capacitor connected between the input terminal of said second transistor switch and the intermediate terminal of said third transistor switch, said first capacitor being connected to the intermediate terminal of said second transistor switch so that voltage drop across said first transistor switch, caused by turning off of said first transistor switch, drives said second transistor switch toward its high impedance state;

said first and second capacitors respectively forming parts of first and second capacitive voltage distribution networks and wherein said first and second capacitive voltage distribution networks respectively include first and second diodes in series with said first and second capacitors.

3. The capacitive voltage distribution network for series connected transistor switches of claim 2 wherein said first and second capacitive voltage distribution networks respectively include first and second resistors, said first and second resistors being connected in parallel with said first and second diodes.

4. A capacitive voltage distribution network for series-connected switches comprising:

first, second and third serially-connected transistor switches connectable in series with a source of voltage and load, each of said transistor switches having an input, an intermediate and an output terminal, control means connected to said first, second and third series-connected transistor switches so that said first, second and third series-connected transistor switches can be all selectively maintained in a high impedance state and a low impedance state, the improvement comprising:

said network including first, second and third capacitors, said first capacitor being connected between the input of said first transistor switch and the intermediate terminal of said second transistor switch, said second capacitor being connected between the input of said second transistor and the intermediate terminal of said third transistor and said third capacitor is connected between the input of said third transistor switch and the output of said third transistor switch.

5. A capacitive voltage distribution network for series-connected switches comprising:

first, second and third serially-connected transistor switches connectable in series with a source of voltage and load, each of said transistor switches having an input, an intermediate and an output terminal, control means connected to said first, second and third series-connected transistor switches so that said first, second and third series-connected transistor switches can be all selectively maintained in a high impedance state and a low impedance state, the improvement comprising:

a first capacitor connected between the input terminal of said first transistor switch and the intermediate terminal of said second transistor switch, and a second capacitor connected between the input terminal of said second transistor switch and the intermediate terminal of said third transistor switch, said first capacitor being connected to the intermediate terminal of said second transistor switch so that voltage drop across said first transistor switch, caused by turning off of said first transistor switch, drives said second transistor switch toward its high impedance state;

said control means comprising first and second complementary transistors respectively connected to said first and second transistor switches, said complementary transistors each having a base and a collector, each of said transistor switches having its intermediate terminal connected to the collector of the corresponding complmentary transistor and having its output terminal connected to the base of the corresponding complementary transistor so that each complementary pair forms a bistable switch.

6. The capacitive voltage distribution network for series connected transistor switches of claim 5 wherein pulse means is connected to the intermediate terminal of at least one of said transistor switches, said pulse means being capable of being pulsed to change the impedance of said series connected transistor switches to and from the high impedance state.

7. The capacitive voltage distribution network for series connected transistor switches of claim 6 wherein said transistor switches and said complementary transistors are respectively PNP and NPN transistors, and said pulse means is connected to the base of one of said PNP transistors.

8. The capacitive voltage distribution network for series connected transistor switches of claim 6 wherein said transistor switches and said complementary transistors respectively comprise a PNP transistor and an NPN transistor, and said pulse means is connected to the base of one of said NPN transistors.

9. The capacitive voltage distribution network for series connected transistor switches of claim 8 wherein a capacitor is connected between the base of said NPN transistor in a complementary pair and the input to that complementary pair.

References Cited

UNITED STATES PATENTS

| | | | |
|---|---|---|---|
| 3,156,831 | 11/1964 | Baude | 307—254 |
| 3,181,010 | 4/1965 | Cotten et al. | 307—255 |

OTHER REFERENCES

Pub. I. "High Voltage Switching Circuit" by Xylander in IBM Tech. Disclosure Bulletin, vol. 5, No. 12, May 1963 pp. 55–56.

DONALD D. FORRER, Primary Examiner

S. D. MILLER, Assistant Examiner

U.S. Cl. X.R.

307—202, 254, 288, 313